(12) United States Patent
Yamaguchi et al.

(10) Patent No.: US 9,859,768 B2
(45) Date of Patent: Jan. 2, 2018

(54) VIBRATION MOTOR

(71) Applicant: Nidec Seimitsu Corporation, Ueda-shi, Nagano-ken (JP)

(72) Inventors: Tsuyoshi Yamaguchi, Ueda (JP); Takayuki Aoi, Ueda (JP); Hiroyuki Kiuchi, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 536 days.

(21) Appl. No.: 14/556,378

(22) Filed: Dec. 1, 2014

(65) Prior Publication Data

US 2015/0236563 A1   Aug. 20, 2015

(30) Foreign Application Priority Data

Feb. 20, 2014   (JP) .................................. 2014-031020

(51) Int. Cl.
*H02K 7/06*   (2006.01)

(52) U.S. Cl.
CPC .................................. *H02K 7/063* (2013.01)

(58) Field of Classification Search
CPC .......... H02K 7/06; H02K 7/063; H02K 7/065; H02K 7/07; H02K 7/075; H02K 23/04; H02K 5/16; H02K 5/163; H02K 5/167; H02K 5/1675; H02K 5/1677; H02K 11/33; H02K 15/02; H02K 23/58
USPC ........................................... 310/67 R, 81, 89
See application file for complete search history.

(56) References Cited

U.S. PATENT DOCUMENTS

| 6,836,039 B2 | 12/2004 | Choi et al. | |
| 7,132,770 B2 * | 11/2006 | Yamaguchi | H02K 7/063 310/268 |
| 7,141,902 B2 * | 11/2006 | Won | H02K 7/063 310/81 |
| 7,485,993 B2 * | 2/2009 | Huang | H02K 7/063 310/268 |
| 7,911,097 B2 * | 3/2011 | Park | H02K 7/063 310/233 |
| 7,964,999 B2 | 6/2011 | Liao | |
| 2002/0163265 A1 * | 11/2002 | Horng | H02K 7/086 310/81 |

(Continued)

FOREIGN PATENT DOCUMENTS

| JP | 10-23708 A | 1/1998 |
| JP | 2002-034195 A | 1/2002 |
| JP | 2004-135463 A | 4/2004 |

(Continued)

*Primary Examiner* — Tran Nguyen
(74) *Attorney, Agent, or Firm* — Keating & Bennett, LLP

(57) ABSTRACT

A vibration motor includes a weight that rotates about a shaft, and has a centroid position different from a central axis of the shaft, a case with a protrusion portion that extends from a lower end of the circumferential surface portion, and a lower end portion of the shaft is fixed to a stator portion. A base of the vibration motor includes a concave portion that is recessed from a radially outer side of the base to a radially inner side of the base at a position overlapping the protrusion portion at a circumferential edge of the base. The entire protrusion portion or a portion of a tip end side in a direction in which the protrusion portion extends is bent radially inside the base so that a surface of the protrusion portion which is toward an upper side is in contact with the base.

19 Claims, 13 Drawing Sheets

(56) References Cited

U.S. PATENT DOCUMENTS

2004/0084980 A1     5/2004   Yamaguchi et al.
2006/0022537 A1     2/2006   Yamaguchi et al.

FOREIGN PATENT DOCUMENTS

| | | |
|---|---|---|
| JP | 2005-027484 A | 1/2005 |
| JP | 2008-289268 A | 11/2008 |
| JP | 2009-095138 A | 4/2009 |
| WO | 2012/008248 A1 | 1/2012 |

* cited by examiner

VIBRATION MOTOR

BACKGROUND OF THE INVENTION

1. Field of the Invention

The present invention relates to a vibration motor and, more particularly, to a vibration motor preferably for use in incoming call notification and the like in a mobile terminal.

2. Description of the Related Art

Some mobile terminals such as mobile phones function to notify a user of an incoming call by generating vibration as well as by generating a ringtone. The vibration for incoming call notification is generated by a vibration motor that is provided in the mobile terminal. A structure in which a weight that is eccentric from a central axis rotates about the central axis so that the vibration is generated is one of vibration-generating structures provided in vibration motors.

A vibration motor that is proposed in Japanese Unexamined Patent Application Publication No. 2008-289268 is an example of vibration motors provided in mobile terminals. This vibration motor includes an eccentric weight that rotates about a shaft, and the eccentric weight rotates about the shaft so that vibration is generated. This vibration motor has an external case that forms an outer shell and a bracket that forms a bottom surface of the vibration motor, and the shaft and components constituting the vibration motor including the eccentric weight are disposed in a space which is formed by the external case and the bracket.

The bracket has a substantially disc shape and has a power supply terminal portion arrangement portion which juts radially outside from a part of a circumferential edge. The external case is a member that is configured to have an annular circumferential surface and a top surface which closes an upper end of the circumferential surface. A lower end portion of the circumferential surface of the external case is incorporated into an outer circumference of the bracket, and a part of the lower end portion of the circumferential surface of the external case is laser-welded to be fixed to the bracket. In addition, one end portion of the shaft is laser-welded to the bracket, and the other end portion of the shaft is laser-welded to the external case.

However, in a case where the external case is fixed to the bracket through the laser welding of the external case and the bracket as in the vibration motor proposed in Japanese Unexamined Patent Application Publication No. 2008-289268, the laser welding results in high manufacturing costs because equipment and running costs for the laser welding are high.

SUMMARY OF THE INVENTION

An exemplary preferred embodiment of the present invention includes a stator portion and a rotor portion. The stator portion includes a base, a case that has a tube-shaped circumferential surface portion and a top surface portion which closes an upper end of the circumferential surface portion, in which a lower end portion of the circumferential surface portion is fixed to the base, a yoke plate that is mounted on the base and is made of a magnetic material, a circuit board that is located on the base, a coil that is located on the circuit board, and a shaft that includes an upper end portion fixed to the top surface portion of the case. The rotor portion includes a rotor yoke that is supported to be rotatable about the shaft via a bearing, a magnet that is held by the rotor yoke, and a weight that rotates about the shaft, and has the centroid position different from the central axis of the shaft. The case further includes a protrusion portion that extends from a lower end of the circumferential surface portion. A lower end portion of the shaft is fixed to the stator portion. The base includes a concave portion that is recessed from a radially outer side of the base to a radially inner side of the base at a position overlapping with at least the protrusion portion at a circumferential edge of the base in a circumferential direction. The protrusion portion is accommodated in the concave portion, and the entire protrusion portion or a portion of a tip end side is bent radially inside the base so that a surface of the protrusion portion which is toward an upper side is in contact with the base.

According to an exemplary preferred embodiment of the present invention, the case includes the protrusion portion extending from the lower end of the circumferential surface portion of the case, and the base includes the concave portion recessed from the radially outer side of the base to the radially inner side of the base. The protrusion portion is accommodated in the concave portion, the entire protrusion portion or a portion of the tip end side is bent radially inside the base, and the surface of the protrusion portion which is toward the upper side is in contact with the base, and thus the case is reliably fixed to the base. Accordingly, a vibration motor is capable of being manufactured without having to use a costly method such as, for example, laser welding, and manufacturing costs can be kept low.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7A is a plan view of the yoke plate, and FIG. 7B is a sectional view taken along line I-I of FIG. 7A.

DETAILED DESCRIPTION OF THE PREFERRED EMBODIMENTS

Hereinafter, exemplary preferred embodiments of the present invention will be described with reference to accompanying drawings. The technical scope of the present invention is not limited to the following description and drawings.

Figure 1:
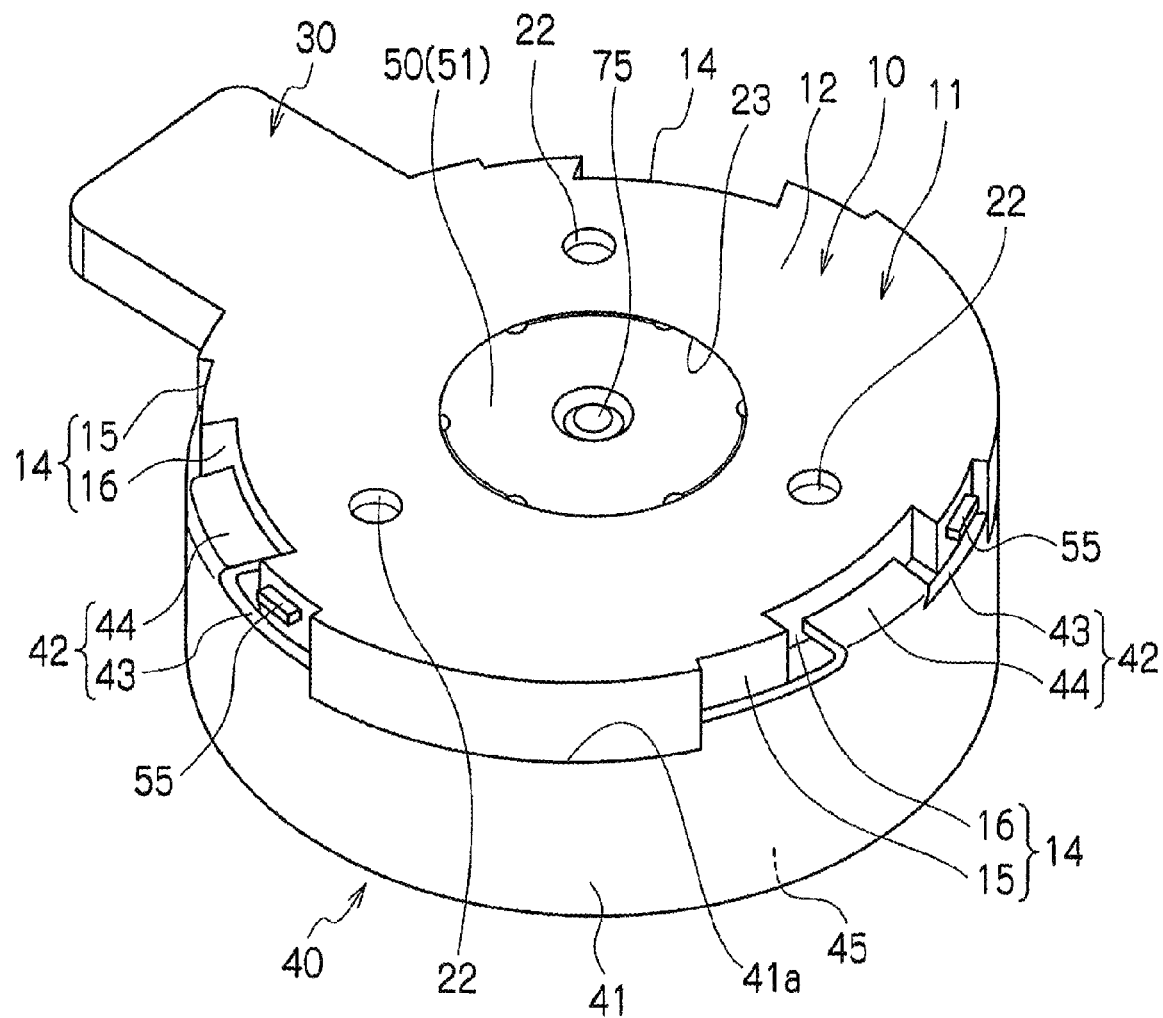
FIG. 1 is a perspective view in which a vibration motor according to a preferred embodiment of the present invention is viewed from a back side of a base.

Firstly, an overall configuration of a vibration motor 1 according to a preferred embodiment of the present invention will be described with reference to FIGS. 1 to 3. FIG. 1 is a view illustrating a state where the vibration motor 1 is viewed from a back surface of a base 10. An upper side in FIG. 1 is a lower side of the vibration motor 1, and a lower side in FIG. 1 is an upper side of the vibration motor 1.

Figure 2:
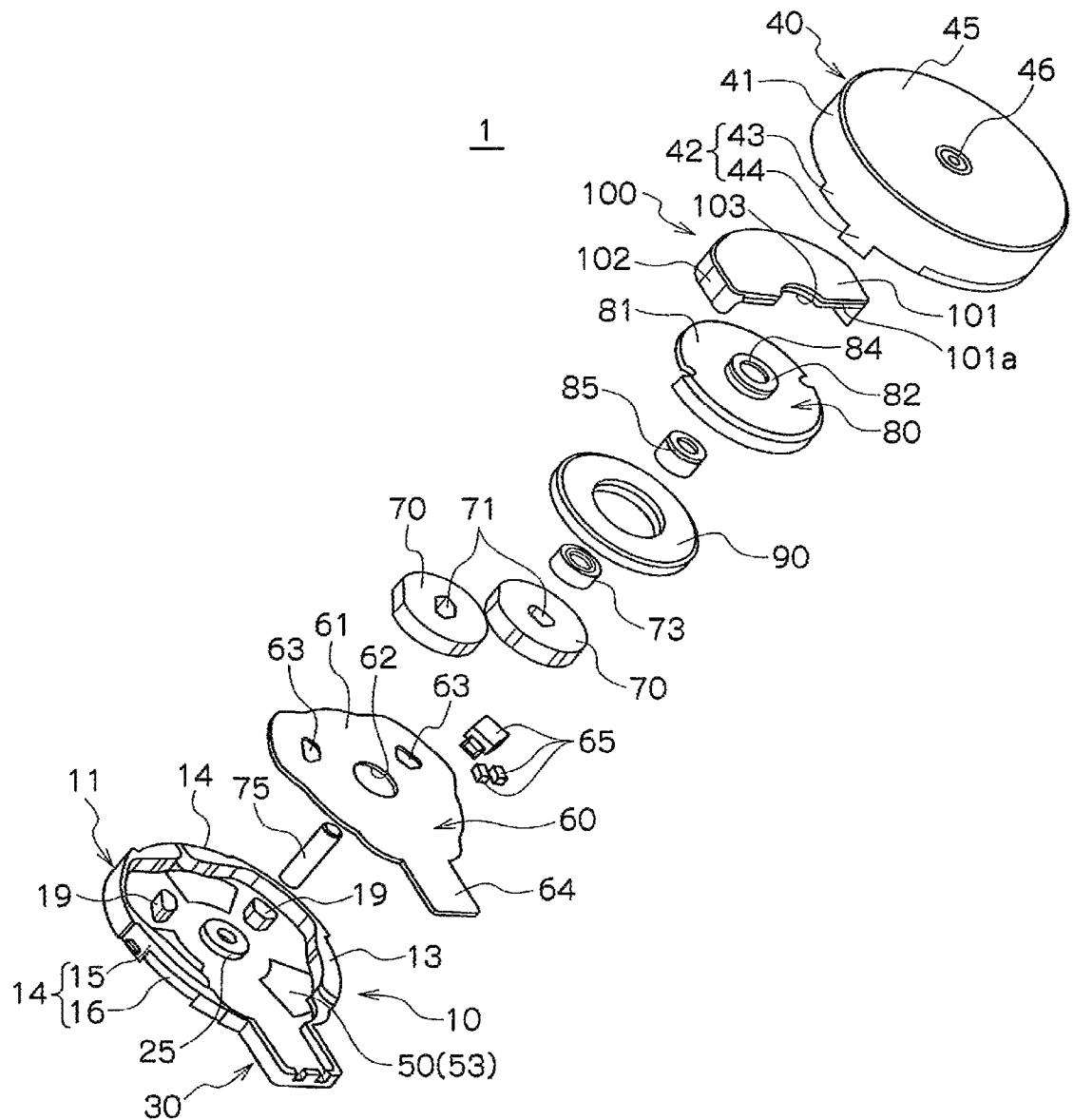
FIG. 2 is an exploded perspective view illustrating components of the vibration motor illustrated in FIG. 1.
Figure 3:
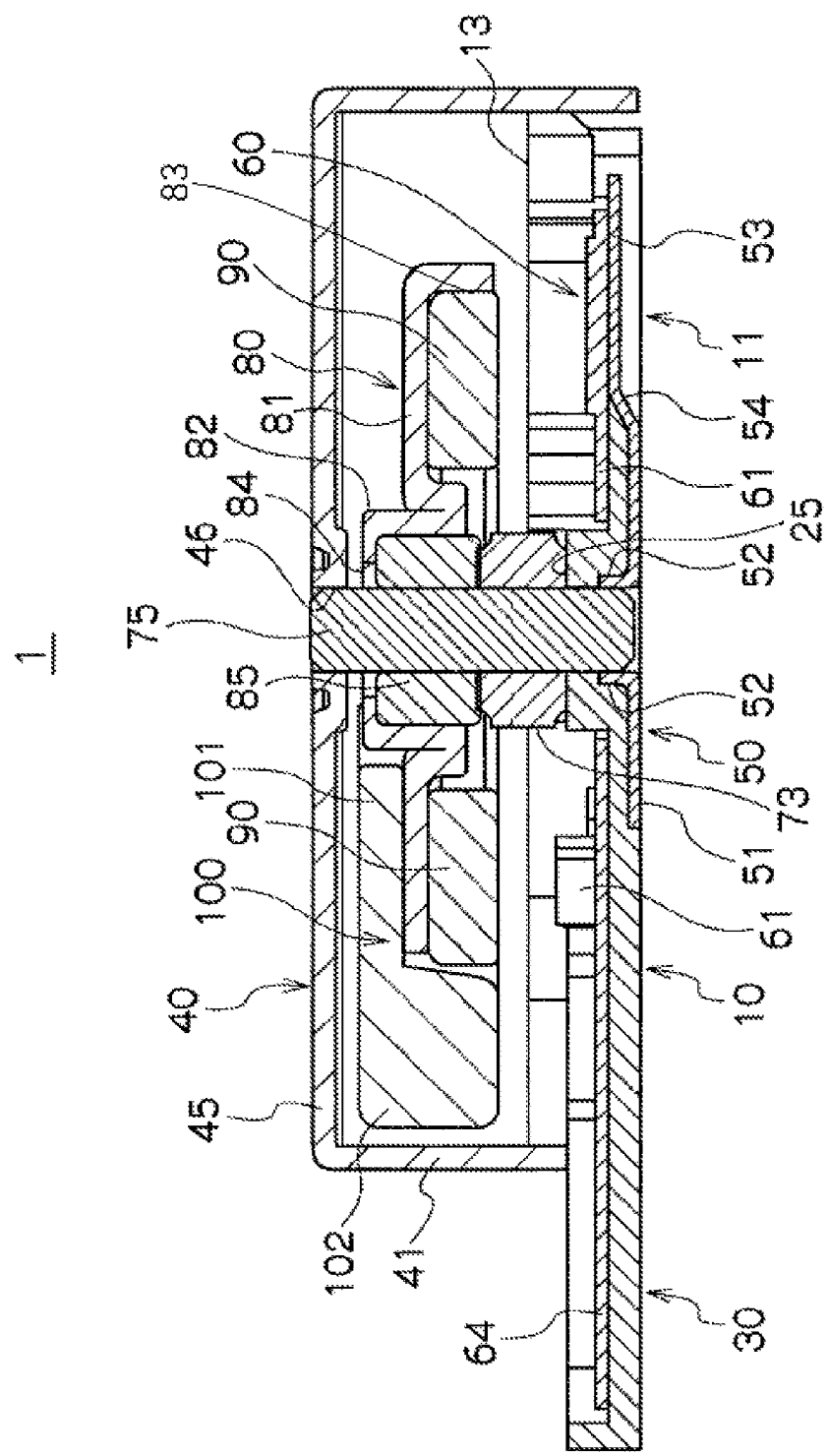
FIG. 3 is a sectional view of the vibration motor illustrated in FIG. 1.

As illustrated in FIGS. 1 to 3, the vibration motor 1 includes a base 10, a stator portion that includes a static member including a case 40 which is covered by the base 10 and is fixed to the base 10, and a rotor portion that rotates in an internal space which is defined by the base 10 and the case 40.

The base 10 defines a bottom portion of the vibration motor 1, and is configured by using a metal or a resin. The base 10 is configured to include a base main body portion 11 that has a circular shape or a substantially circular shape, and a terminal portion arrangement portion 30 that juts radially outside the base main body portion 11. The base 10 preferably includes concave portions 14, which are recessed from a radially outer side of the base 10 to a radially inner side of the base 10, in an outer circumferential surface of the base main body portion 11.

The case 40 preferably includes a tube-shaped circumferential surface portion 41, and a top surface portion 45 that closes an upper end of the circumferential surface portion 41. The circumferential surface portion 41 includes a protrusion portion 42, which extends to a lower side from the circumferential surface portion 41, in a lower end portion of the circumferential surface portion 41. The concave portion 14 of the base 10 and the protrusion portion 42 of the case 40 described above are provided to overlap in a radial direction at the same circumferential-direction position of the base 10.

The protrusion portion 42 of the case 40 is accommodated in the concave portion 14 because the entire protrusion portion 42 or a portion of a tip end side of the protrusion portion 42 is bent from the radially outer side of the base 10 to the radially inner side of the base 10. A surface of a portion of the protrusion portion 42 that is accommodated in the concave portion 14 which is toward the upper side is in contact with the base 10. In addition, a lower end portion 41a of the circumferential surface portion 41 is in contact with the base 10 at a different circumferential-direction position than the position of the protrusion portion 42. The case 40 and the base 10 are fixed by the above-described configuration provided in the case 40 and the base 10.

The base 10 and the case 40 define an outer shell of the vibration motor 1, and the stator portion and the rotor portion other than the base 10 and the case 40 are accommodated in the base 10 and the case 40.

Members that define the stator portion other than the base 10 and the case 40 include a yoke plate 50 that is mounted on the base 10 and is preferably made of a magnetic material, a circuit board 60 that is arranged on the base 10, coils 70 that are arranged on the circuit board 60, and a shaft 75 that includes an upper end portion fixed to the top surface portion 45 of the case 40 and a lower end portion fixed to the stator portion.

The yoke plate 50 is mounted on the base 10 by being integrally provided with the base 10 or being in close contact with an upper surface of the base 10. The circuit board 60 is configured to include a substrate main body portion 61 on which a required electronic component 65 is mounted and a terminal portion 64 jutting outside from the substrate main body portion 61, and is arranged on the upper surface of the base 10. The number of the coils 70 that are provided is preferably two, for example, and each of the coils 70 is arranged on the circuit board 60. The shaft 75 is provided to extend in a vertical direction of the vibration motor 1 in the middle of the vibration motor 1. An upper end portion of the shaft 75 is fixed to the top surface portion 45 in the middle of the top surface portion 45 defining the case 40, and a lower end portion of the shaft 75 is fixed to the base main body portion 11 in the middle of the base main body portion 11 constituting the base 10.

The rotor portion preferably includes a rotor yoke 80 that is supported to be rotatable about the shaft 75 via a bearing 85, a magnet 90 that is held by the rotor yoke 80, and a weight 100 that rotates about the shaft 75 and has a centroid position different than the central axis of the shaft 75.

The rotor portion generates vibration when the weight 100 rotates about the shaft 75. The rotor yoke 80 is preferably provided with a disc shape or a substantially disc shape, and includes a hole 84 at the center of the rotor yoke 80. The shaft 75 is inserted into the hole 84 via the bearing 85. The rotor yoke 80 rotates about the shaft 75. The magnet 90 is preferably provided with a doughnut shape. The magnet 90 is held by the rotor yoke 80, and rotates about the shaft 75 with the rotor yoke 80. The weight 100 is preferably provided with a semicircular shape or a substantially semicircular shape in plan view, and the centroid position of the weight 100 is located radially outside the center of the shaft 75. The weight 100 is integrally provided with the rotor yoke 80, and rotates about the shaft 75.

Since the vibration motor 1 has the configuration described above, the vibration motor 1 fixes the base 10 and the case 40 at a high strength and is capable of being manufactured at a low cost, which are advantageous effects that are achieved by the vibration motor 1 of the present preferred embodiment of the present invention.

Hereinafter, each configuration of the vibration motor according to various preferred embodiments of the present invention will be described in detail with appropriate reference to accompanying drawings.

The base 10 is a member that defines a bottom surface of the vibration motor, and the case 40 is fixed to the base 10. A cast metal and a molded resin can be used in the base, for example. Hereinafter, the base 10, in which the yoke plate 50 made of a magnetic material is preferably insert-molded, will be described as an example.

Figure 4:
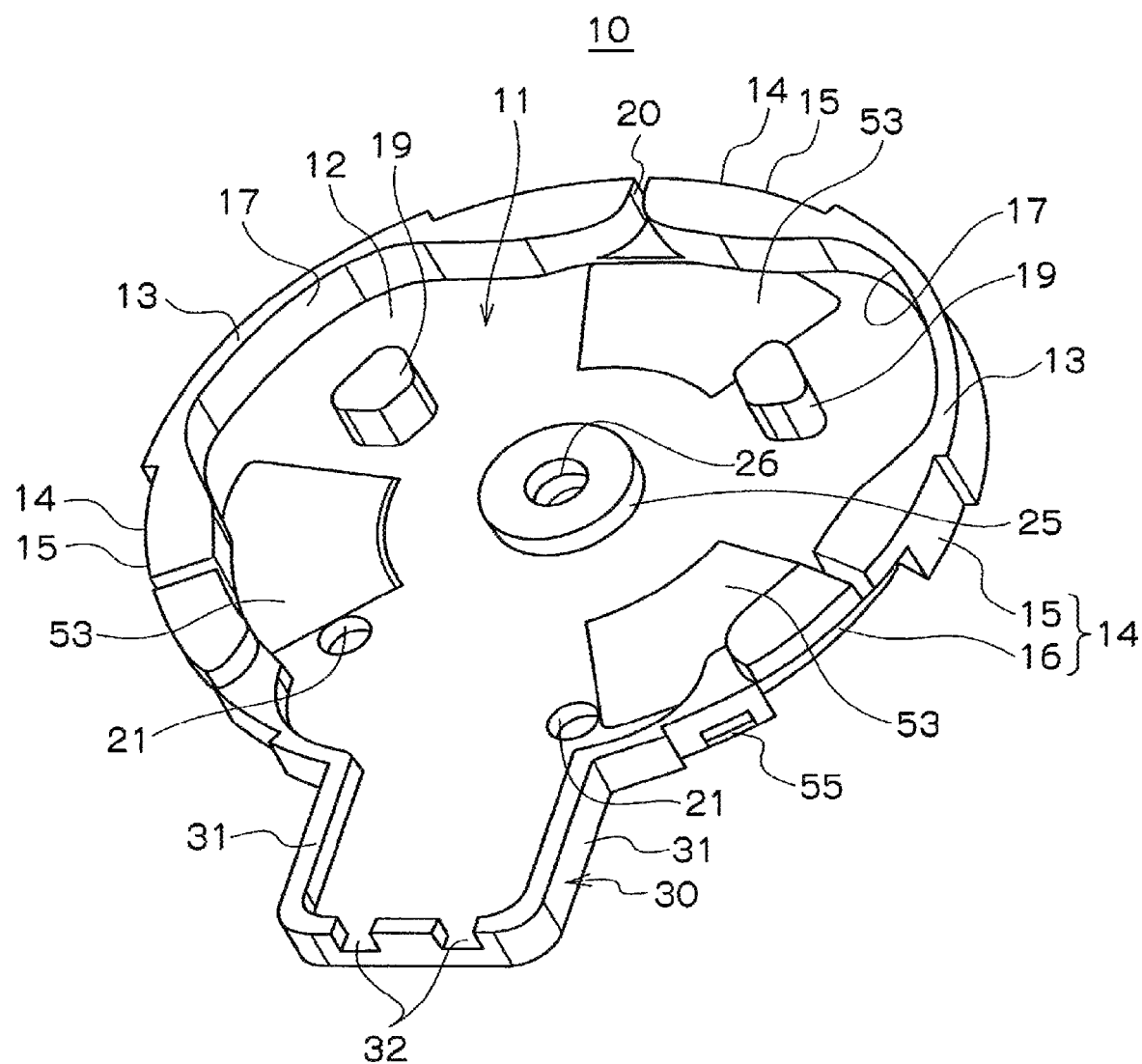
FIG. 4 is a perspective view of the base of the vibration motor illustrated in FIG. 1.

As illustrated in FIG. 4, the base 10 includes the base main body portion 11 that includes a circular shape or a substantially circular shape, and the terminal portion arrangement portion 30 that juts radially outside the base main body portion 11. The base main body portion 11 accommodates the stator portion and the rotor portion on an upper surface side of the base main body portion 11. In addition, the terminal portion 64 of the circuit board 60 is preferably located in the terminal portion arrangement portion 30. The base 10 that is illustrated in FIG. 4 is an example of the base 10 according to a preferred embodiment of the present invention. The shape of the base 10 is not limited to the shape that is illustrated in FIG. 4.

The base main body portion 11 includes a flat main body bottom surface portion 12, and a side wall portion 13 that is provided at a circumferential edge of the main body bottom surface portion 12.

The main body bottom surface portion 12 includes a cylindrical projecting portion 25, which protrudes towards the upper axial side from the main body bottom surface portion 12, in the middle of the main body bottom surface portion 12. The projecting portion 25 preferably includes a hole 26 at the center of the projecting portion 25, and the shaft 75 is accommodated in the hole 26.

In addition, the main body bottom surface portion 12 preferably includes coil positioning units 19 at two places of the main body bottom surface portion 12. A convex portion that protrudes to the upper side from an upper surface of the main body bottom surface portion 12 at a predetermined position of the main body bottom surface portion 12 defines the coil positioning unit 19, and the coil 70 is mounted on a predetermined position of the circuit board 60. The number of the places where the coil positioning units 19 are provided is not limited to two, and the coil positioning units 19 can also be provided at three or more places according to the number of the coils 70 which are mounted. In addition, the coil positioning units 19 do not necessarily have to be integrally molded with the base 10. In an alternative configuration, the base 10 and the coil positioning units 19 can be separately provided and the coil positioning units 19 can be mounted on the base 10. The coil positioning units 19 also preferably have a positioning function for the circuit board 60 in order to arrange the circuit board 60 at an appropriate position because the coil positioning units 19 are provided to penetrate the circuit board 60, which is arranged on the base 10, in the thickness direction of the circuit board 60.

Figure 5:
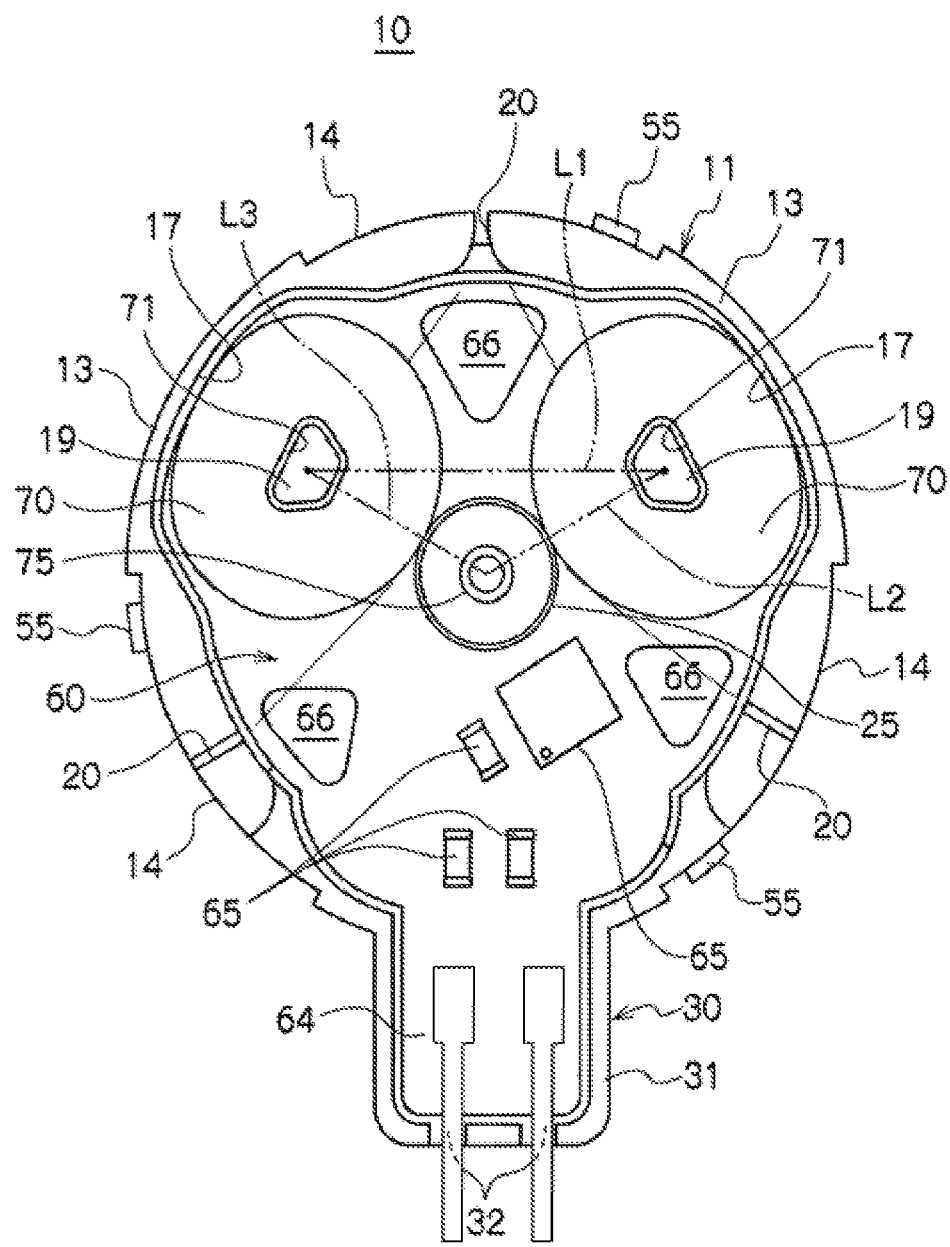
FIG. 5 is an illustration showing a positional relationship between a shaft and a coil positioning unit according to a preferred embodiment of the present invention.

FIG. 5 illustrates positional relationship between the shaft 75 and the coil positioning unit 19. As illustrated in FIG. 5, three line segments L1, L2, and L3 that respectively link the center of the shaft 75 to the centers of the coil positioning units 19 are preferably provided in a triangular shape. In other words, the center of the shaft 75 and the centers of the coil positioning units 19 are not arranged on a single straight line but are instead arranged at shifted positions. In a case where the center of the shaft 75 and the centers of the coil positioning units 19 are arranged so that the three line segments L1, L2, and L3 that respectively link the center of the shaft 75 to the centers of the coil positioning units 19 define a triangular shape, a larger space for mounting the required electronic component 65 on the circuit board 60 can be provided than in a case where the center of the shaft 75 and the centers of the coil positioning units 19 are arranged on a single straight line. In addition, overlapping of the coil positioning units 19 and the yoke plate can also preferably be prevented.

The side wall portion 13 is a wall surface that is positioned on higher towards and axial side than a lower surface of the circuit board 60 including an upper surface arranged in the base 10. In the example that is illustrated in FIG. 4, the side wall portion 13 is provided over the substantially entire circumference of the base main body portion 11.

The side wall portion 13 preferably includes the concave portions 14, where an outer circumferential surface of the side wall portion 13 is recessed to the center side of the base main body portion 11, in three circumferential-direction places of the base main body portion 11. The concave portions 14 are preferably configured to include a first concave portion 15 that is shallowly recessed in the radial direction and a second concave portion 16 that is deeply recessed in the radial direction in the middle of the width direction of the first concave portion 15. The concave portion 14 is a site where the protrusion portion 42 provided at a lower end of the circumferential surface portion 41 defining the case 40 is accommodated inside the concave portion 14. Specifically, the first concave portion 15 is a site where a protrusion main body portion 43 of the protrusion portion is accommodated, and the second concave portion 16 is a site where an extending portion 44 defining the protrusion portion 42 is bent toward an inner side from the radially outer side of the base 10 and is accommodated. The concave portion 14 and the center position of the coil 70 mounted on the coil positioning unit 19 described above are preferably shifted in a circumferential direction of the base main body portion 11.

The side wall portion 13 is configured so that the radial-direction dimension (thickness of the side wall portion 13) of the base main body portion 11 is larger than the dimension at which the second concave portion 16 in the radial direction of the base main body portion 11 is recessed in the radial direction of the base main body portion 11 at the position where the concave portion 14 is provided. Accordingly, the radially outer side and inner side are closed by the member defining the side wall portion 13 at the position of the concave portion 14.

The side wall portion 13 includes one or more grooves 20 across the base main body portion 11 in the radial direction. The number of the grooves 20 that the side wall portion 13 of the base 10 of this preferred embodiment includes is preferably three. A land 66 of the circuit board 60 is provided inside the groove 20 in the radial direction of the base main body portion 11, and a lead wire of the coil 70 is preferably soldered to the circuit board 60 at the land 66. A tip end of the lead wire of the coil 70 is positioned radially inside the position of the groove 20 or is positioned inside an outer side end portion of the groove 20 extending in the radial direction of the base main body portion 11.

The groove 20 functions as a guide for the lead wire extending from the coil 70. In other words, the lead wire passes through the groove 20 during the soldering of the lead wire to the land 66, and thus the groove 20 maintains the positioning of the lead wire so that the lead wire extending from the coil 70 passes over the land 66. The state of the lead wire where the lead wire passes over the land 66 is maintained by the groove 20 while the lead wire is soldered to the circuit board 60 at the position of the land 66. After the soldering, a tip end side of the lead wire is cut at the position radially inside the position of the groove 20 or at a position inside the outer side end portion of the groove 20 extending in the radial direction of the base main body portion 11.

In addition, the side wall portion 13 includes a recess 17, where an inner wall side is recessed to an outer side, at a position where the coil 70 is provided in the circumferential direction of the base main body portion 11. A part where the recess 17 is provided is a site configured to accommodate a portion of the coil 70 inside the portion where the recess 17 is located. A portion of the coil 70 that is accommodated in the recess 17 is a certain area positioned on a radially outer side of the base main body portion 11. The portion where the recess 17 is provided preferably has a thickness that is relatively smaller than the thickness of the other portion of the side wall portion 13.

Figure 6:
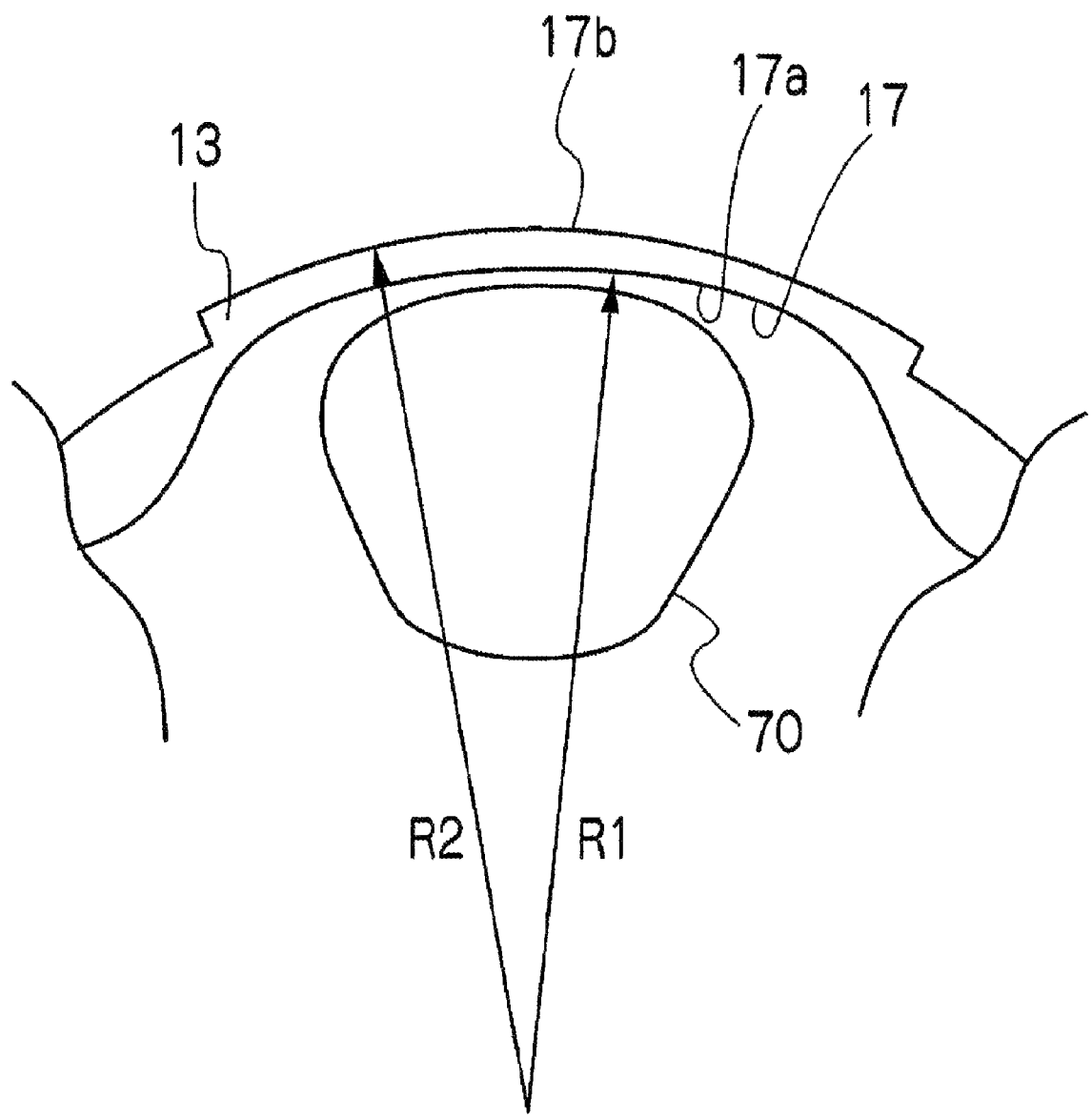
FIG. 6 is an explanatory drawing illustrating a relationship between the radius of an outer circumferential surface side and the radius of an inner circumferential surface side of a portion of a side wall portion where a recess is defined according to a preferred embodiment of the present invention.

As illustrated in FIG. 6, the portion where the recess is provided is configured so that the curvature 1/R2 on an outer circumferential wall 17b side is smaller than the curvature 1/R1 on an inner circumferential wall 17a side. In other words, the radius of curvature R2 on the outer circumferential wall 17b side is larger than the radius of curvature R1 on the inner circumferential wall 17a side. The portion where the recess 17 is located partitions the coil 70 from the case 40 so as to insulate the coil 70 and the case 40 from each other, and prevents an electrical short of the coil 70 and the case 40. As described later, the coil 70 is preferably provided so that the cross-sectional area on an upper side in the height direction of the coil 70 is slightly smaller than the cross-sectional area on a lower side. Accordingly, the height of a portion where the recess 17 is located can be smaller than the height of the coil 70, that is, a position of an upper end surface of the coil 70. In a case where a portion where the recess 17 is located is lower in height than an upper surface of the coil 70, the side wall portion 13 does not hinder the mounting of the coil 70 and the coil 70 can be mounted smoothly. However, a portion where the recess 17 is located may also be greater in height than the position of the upper end surface of the coil 70, and may also be equal in height to the position of the upper end surface of the coil 70.

Since the recess 17 is provided in the side wall portion 13, the radial-direction dimension of the base 10 can be smaller than the radial-direction dimension of the base 10 where the recess 17 is not provided without being affected by the position where the coil 70 is mounted and the size of the coil 70 mounted. Accordingly, the vibration motor 1 can be compact in size.

In the example that is illustrated in FIG. 4, the side wall portion 13 is preferably provided over substantially the entire circumference of the base main body portion 11. However, if the circumferential-direction width of the side wall portion is larger than the circumferential-direction width of the case 40 of the protrusion portion 42, the side wall portion 13 may have a partial formation, including an area where the side wall portion 13 overlaps with the protrusion portion 42 of the case 40, in the circumferential direction of the base main body portion 11.

In addition, the base 10 can also be provided without providing the side wall portion 13 at a circumferential edge of the base main body portion 11. For example, the upper surface of the base 10 may be flat and the concave portion 14 may be provided in an outer circumferential surface itself of the base 10.

The terminal portion arrangement portion 30 is a site where the terminal portion 64 of the circuit board 60 is arranged on an upper surface of the terminal portion arrangement portion 30, and preferably is provided in a rectangular shape or a substantially rectangular shape. The terminal portion arrangement portion 30 preferably includes a rib 31 at a circumferential edge of the terminal portion arrangement portion 30. The rib 31 is a wall surface that surrounds the terminal portion arrangement portion 30, and an upper end portion of the rib 31 is positioned on a side axially higher than a lower surface of the terminal portion 64 arranged in the terminal portion arrangement portion 30. The rib 31 is preferably continuously provided with the side wall portion 13 of the base main body portion 11. As illustrated in FIG. 4, the rib 31 preferably includes two grooves 32 connecting an inner side to an outer side of the terminal portion arrangement portion 30. A lead wire (not illustrated) of the vibration motor 1 passes through the two grooves 32, and the two grooves 32 determine a direction in which the lead wire extends.

Next, the yoke plate 50 that is integrally molded with the base 10 will be described with reference to FIGS. 7A and 7B. The yoke plate 50 is a component of the stator portion as described above. However, the yoke plate 50 will be described herein so as to describe the configuration in which the yoke plate 50 is integrated with the base 10. Hereinafter, a case where the base 10 and the yoke plate 50 are integrated with each other as a single monolithic member by insert molding will be described. However, methods for mounting the yoke plate 50 on the base 10 is not limited to the integration between the base and the yoke plate 50 by insert molding. For example, the yoke plate 50 and the base 10 may be separately produced so that the yoke plate 50 is mounted by covering the upper surface of the base 10.

The yoke plate 50 is made of a magnetic material, and guides a magnetic flux formed by the coils 70 to the magnet 90. As illustrated in FIG. 7A, the yoke plate 50 is preferably configured to include a circular portion 51 that is positioned in the middle of the yoke plate 50, and three detent torque generating units 53 that are arranged outside the circular portion 51 and generate detent torque. In the yoke plate 50, each of the circular portion 51 and the detent torque generating units 53 is preferably flat as illustrated in FIG. 7B. The circular portion 51 and the detent torque generating unit 53 are shifted from each other in a thickness direction of the yoke plate 50 when a connection portion 54 between the circular portion 51 and the detent torque generating unit 53 is bent. Specifically, the detent torque generating unit 53 is shifted to a higher side in a height direction of the vibration motor 1 than the circular portion 51.

At least a portion of a surface of the yoke plate 50 on the circuit board 60 side is exposed. In this preferred embodiment, the detent torque generating unit 53 that is shifted to a higher side in the axial direction of the vibration motor 1 than the circular portion 51 is exposed. Accordingly, the detent torque, which is static torque that acts when the coil 70 is not excited, is likely to be generated with ease. In addition, the thickness of the base 10 is reduced since at least a portion of the surface on the circuit board 60 side is exposed. Accordingly, the height-direction space of the vibration motor 1 that is surrounded by the base 10 and the case 40 is widened. In a case where the detent torque generating unit 53 is exposed from the base 10, the detent torque generating unit 53 is also capable of being exposed from the base 10 by, for example, providing a gap between the detent torque generating unit 53 and the base 10.

The circular portion 51 preferably includes a through-hole 56 penetrating the circular portion 51 in the thickness direction at the center of the circular portion 51. The through-hole 56 is a hole in which the shaft 75 is accommodated. In addition, the circular portion 51 preferably includes a shaft supporting unit 52, which supports the shaft 75, in the middle of the circular portion 51. The shaft supporting unit 52 is preferably defined by a bent portion where the circumference (inner circumferential edge of the circular portion 51) of the through-hole 56 is bent to the axially upper side. The shaft supporting unit 52 is configured to support the shaft 75 with an inner surface being in close contact with an outer circumferential surface of the shaft 75.

The shaft supporting unit 52 is defined by the bent portion which is bent to the upper side as described above, and thus an area where the yoke plate 50 supports the shaft 75 is lengthened in the direction in which the shaft 75 extends.

Accordingly, the shaft 75 is firmly supported by the shaft supporting unit 52 of the yoke plate 50. In addition, the shaft supporting unit 52 preferably supports the shaft 75 in the middle of the yoke plate 50, and thus each of the members defining the rotor portion are preferably arranged at relatively close areas of the yoke plate 50 in an area between the shaft 75 and the circumferential surface portion 41 of the case 40. Each of the members defining the rotor portion preferably are closely arranged particularly in an area outside the yoke plate 50 among the relatively close areas of the yoke plate 50. Accordingly, the detent torque, which acts when the coil 70 is not excited, is generated with ease.

Figure 7A:
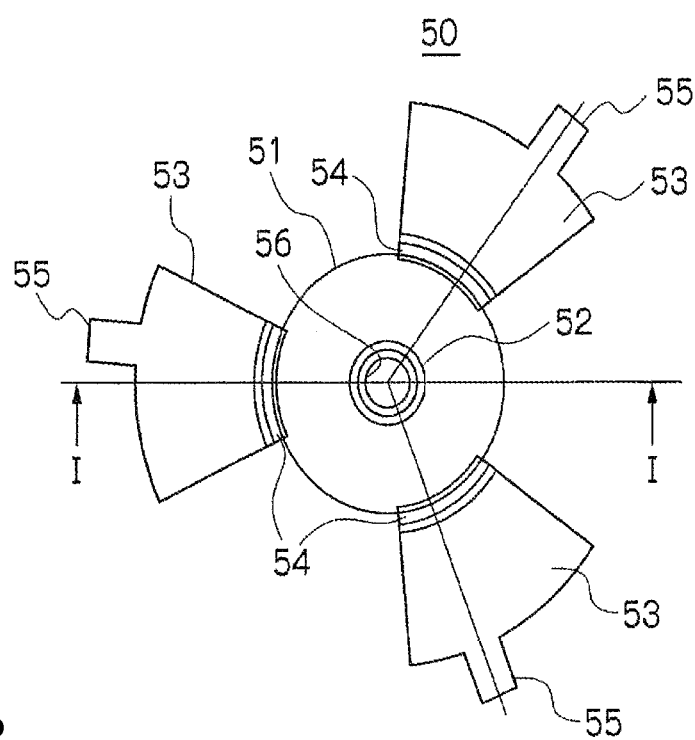
FIGS. 7A and 7B are explanatory drawings illustrating a yoke plate.
Figure 7B:
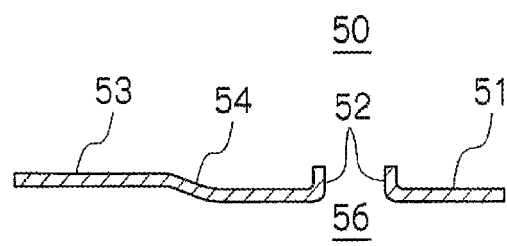

The yoke plate 50 that is illustrated in FIGS. 7A and 7B preferably includes protruding portions 55, which protrude outside the yoke plate 50 and define a portion of the yoke plate, at an outer circumferential edge of the detent torque generating unit 53. The protruding portion 55 is a portion of a joint portion that connects the yoke plates 50. As illustrated in FIG. 4, the protruding portion 55 is exposed from the base 10 in a state of being accommodated in the side wall portion 13 of the base 10. A reason for the exposure of the protruding portion 55 from the base 10 will be described below.

When the yoke plate 50 and the base 10 are integrally molded by insert molding, the plurality of yoke plates 50 are preferably arranged, in a state of being connected by the joint portion, in respective rooms of a mold configured to mold the base 10 and set in a molding apparatus. Since the plurality of yoke plates 50 are set in the molding apparatus in a state of being connected by the joint portion, a plurality of the integrated yoke plates 50 and the bases 10 are preferably manufactured at the same time. In a case where the plurality of integrated yoke plates 50 and bases 10 are manufactured by the process, the plurality of yoke plates 50 are preferably connected to each other by the joint portion positioned outside the side wall portion 13 of the base 10. In a case where the integrated yoke plates 50 and bases 10 are disassembled one by one, the disassembly is preferably performed by cutting the joint portion in the vibration motor 1 of this preferred embodiment. In this case, only the joint portion that is positioned outside the base 10 is removed, and the protruding portion 55 that is present at the outer circumferential edge of the detent torque generating unit 53 of the yoke plate 50 is left as it is without being cut from the yoke plate 50. Accordingly, the process for cutting the protruding portion 55 is excluded from the manufacturing process, and thus the manufacturing cost is significantly reduced while less time is required for the manufacturing.

The position where the protruding portion 55 is exposed is not limited to the side wall portion 13 of the base 10. The position where the protruding portion 55 is exposed is determined by the position where the joint portion is provided, the state where the yoke plate 50 is arranged in the mold during the integral molding of the yoke plate 50 and the base 10, and the like. For example, the protruding portion 55 may be exposed from the base 10 in the main body bottom surface portion 12 of the base 10.

The base 10 preferably further includes a plurality of exposure portions 22 on a lower surface of the base main body portion 11. The exposure portions 22 are used when the plurality of yoke plates 50 are accommodated in a plurality of the molds and the plurality of integrated yoke plates 50 and the bases 10 are manufactured in a single process. In a case where the plurality of integrated yoke plates 50 and the bases 10 are manufactured in a single process, shifting of the yoke plate 50 in the mold is preferably prevented by pressing with, for example, a pin or the like from both sides of the yoke plate 50 in the mold. The exposure portion 22 is a portion corresponding to a receiving portion that receives the pin and the like. The exposure portions 22 that are illustrated in FIG. 1 are preferably provided at three places of the base main body portion 11, for example. However, the exposure portions 22 do not necessarily have to be provided at the three places, and may be provided at one or more places.

The process of integrating the yoke plate 50 with the base 10 is not limited to integrating the plurality of yoke plates 50 and bases 10 at the same time, and the yoke plates 50 and the bases 10 may be integrated one by one. In this case, the molding process is preferably performed with the yoke plate 50 being held by a plurality of positioning pins so as to prevent shifting in position of the yoke plate 50 in the mold. As a result, a plurality of holes 21 that penetrate the yoke plate 50 in the thickness direction are located at the positions where the positioning pins are provided. In other words, the plurality of holes 21 that penetrate the yoke plate 50 in the thickness direction function to prevent shifting in position of the yoke plate 50 with respect to the base 10 with the positioning pins being arranged in the holes 21. The number of the positioning pins provided may be at least two so that the yoke plate 50 is not shifted in position when a resin is injected into the mold and the yoke plate 50 is held at two or more places.

The base 10 including both the holes 21 and the exposure portions 22 is illustrated in FIGS. 1 and 4 for convenience of description. However, depending on the desired process of integrating the yoke plate 50 with the base 10, only the holes 21 or only the exposure portions 22 can also be provided in the base 10.

Figure 8:
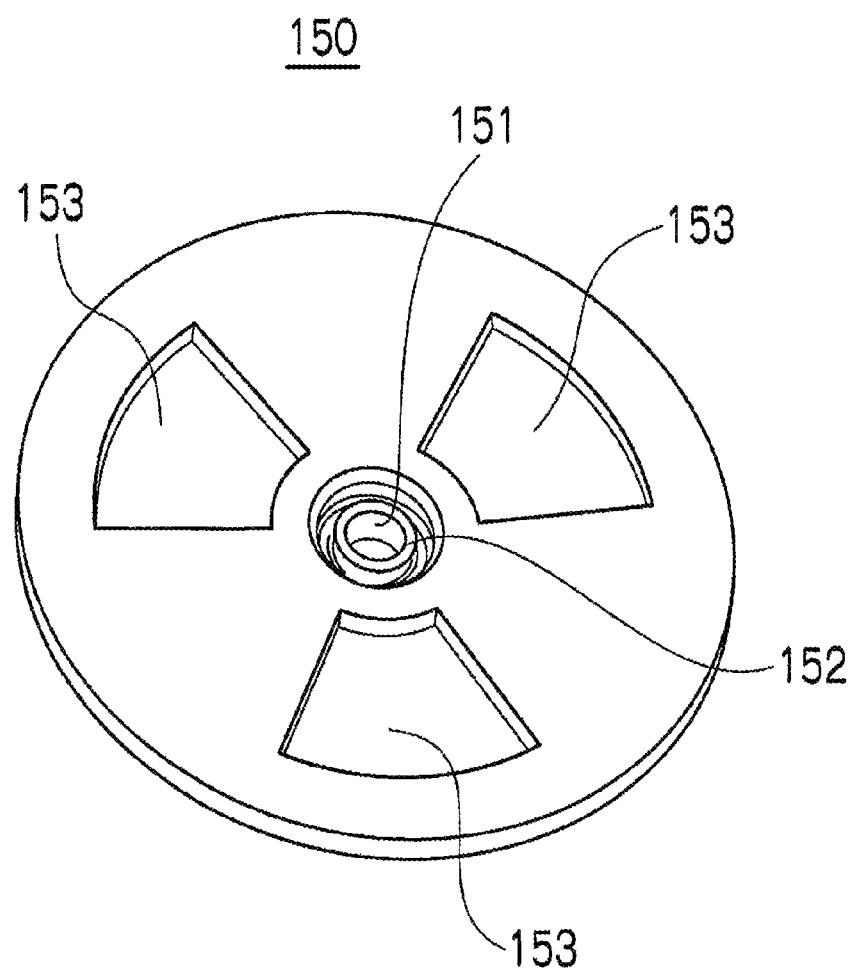
FIG. 8 is a perspective view of a yoke plate according to a preferred embodiment of the present invention other than that illustrated in FIG. 7.

A yoke plate that is preferably provided in a disc shape can be used as the yoke plate. FIG. 8 illustrates an example of a yoke plate 150 that preferably has a disc shape. The yoke plate 150 preferably includes a support hole 151, which supports the shaft 75, at the center of the yoke plate 150. In addition, the yoke plate 150 preferably includes a shaft supporting unit 152 that is formed by bending a circumferential edge of the support hole 151 in a direction in which the shaft extends. Moreover, the yoke plate 150 preferably includes three, for example, detent torque-generating fan-shaped holes 153 between the support hole 151 and the circumferential edge of the yoke plate 150 in a radial direction of the yoke plate 150. The three detent torque-generating fan-shaped holes 153 are preferably evenly arranged in a circumferential direction of the yoke plate 150. The yoke plate 150 can be integrated with the base 10 by insert molding as is the case with the yoke plate 50.

In addition, the base 10 preferably includes a ground-connecting exposure portion 23, which exposes a lower surface of the yoke plate 50 from the lower surface of the base main body portion 11, in the middle of the base main body portion 11. In the base 10 of this preferred embodiment, the circular portion of the yoke plate 50 is exposed from the ground-connecting exposure portion 23 (refer to FIG. 1). The ground-connecting exposure portion 23 allows a portion of the yoke plate 50 to be exposed to allow the yoke plate 50 to be grounded on a portable terminal device and the like on which the vibration motor 1 is mounted, and allows the yoke plate 50 to function as a ground connection.

The case 40 is preferably a cylindrical shape made by, for example, a metal, a resin, or the like, and is configured to include the tube-shaped circumferential surface portion 41 and the top surface portion 45 that closes the upper end of the circumferential surface portion 41. In other words, the case 40 is preferably configured to have the disc-shaped top surface portion 45 and the circumferential surface portion 41 that is provided at a circumferential edge of the top surface portion 45. The top surface portion 45 preferably includes a hole 46 at the center of the top surface portion 45. The hole 46 is a site where the shaft 75 is fixed with an upper end of the shaft 75 fitted into the hole 46. When the case 40 is fixed to the base 10, the hole 46 that is provided at the center of the case 40 and the hole 26 that is provided in the middle of the base 10 have positions matching with each other in a horizontal direction.

The circumferential surface portion 41 preferably includes the protrusion portion 42, which extends from the circumferential surface portion 41 toward the lower side, at the lower end of the circumferential surface portion 41. The protrusion portion 42 is configured to include the protrusion main body portion 43 that extends to the lower side from the lower end of the circumferential surface portion 41, and the extending portion 44 that extends further downward from the protrusion main body portion 43 in the middle of the width direction of the protrusion main body portion 43. The protrusion main body portion 43 is a site that is accommodated in the first concave portion 15 which is defined in the base 10. The extending portion 44, which is bent inside from a radially outer side of a main body portion of the base 10, is a site that is accommodated in the second concave portion 16 of the base 10.

The base 10 and the case 40 that have been described above are preferably fixed as follows.

The case 40 is covered by the base 10 with the circumferential surface portion 41 of the case 40 matching with the side wall portion 13 defined in the base 10. As illustrated in FIG. 1, the protrusion main body portion 43 of the case 40 that is defined in the circumferential surface portion 41 of the case 40 is accommodated in the first concave portion 15 of the base 10. In addition, an area of the circumferential surface portion 41 of the case 40 between the protrusion main body portion 43 and the protrusion main body portion 43 is in close contact with an upper surface of the side wall portion 13 of the base 10 so that the lower end portion 41a of the circumferential surface portion 41 is pressed against the upper surface of the side wall portion 13 of the base 10.

The extending portion 44 that defines the protrusion portion 42 is bent inside from the radially outer side of the base 10 and is accommodated inside the second concave portion 16 as illustrated in FIG. 1. The bent extending portion 44 is in a state of extending in the radial direction of the base 10 inside the second concave portion 16. In addition, an inner surface of the extending portion 44 is toward the upper side and is in contact with the base 10 inside the second concave portion 16. As a result, the lower end portion 41a of the circumferential surface portion 41 and the extending portion 44 positioned in an area between the protrusion portions 42 of the case 40 pinch the side wall portion 13 of the base 10 so that the base 10 and the case 40 are fixed. However, FIG. 1 is a view in which the vibration motor is viewed from a lower surface side of the base 10, and thus the lower side in FIG. 1 is the upper side of the vibration motor 1 and the upper side in FIG. 1 is the lower side of the vibration motor 1. As described above, the concave portion 14 of the base 10 and the center position of the coil 70 mounted on the coil positioning unit 19 are preferably shifted in the circumferential direction of the base main body portion 11, and thus transmission of stress generated in the base 10 to the coil is prevented when the case 40 is fixed to the base 10.

The base 10 of this preferred embodiment includes the side wall portion 13 at the circumferential edge of the base 10. The side wall portion 13 extends to the upper side from the main body bottom surface portion 12 of the base main body portion 11, and the upper surface of the side wall portion 13 is positioned on a higher side than the lower surface of the circuit board 60 arranged in the base 10. Accordingly, the circumferential surface portion 41 of the case 40 and the base 10 are in contact at a position on a relatively upper side of the vibration motor, and the extending portion 44 defining the protrusion portion 42 of the case 40 is bent with ease inside the concave portion of the base 10 when the case 40 is fixed to the base 10. In addition, because of the above-described configuration, the area of contact between the base 10 and an inner circumferential surface of the case 40 is larger than in a case where the side wall portion 13 is not provided, and thus deformation of the base 10 is prevented when the extending portion 44 is bent.

In the base 10 that has been described above, the side wall portion 13 is preferably provided over the entire or substantially the entire circumference of the base main body portion 11. However, the side wall portion 13 does not necessarily have to be provided over the entire circumference of the base main body portion 11 or over the substantially entire circumference of the base main body portion 11. The side wall portion 13 may instead be partially provided at a position where the concave portion 14 is provided. In this case, the circumferential-direction width of the side wall portion 13 is larger than the circumferential-direction width of the protrusion portion 42 of the case. When the circumferential-direction width of the side wall portion 13 is larger than the circumferential-direction width of the protrusion portion 42 of the case, the entire protrusion portion 42 is in contact with the side wall portion 13 in the width direction, and the case 40 is fixed to the base 10 at a high strength. In addition, the width of the concave portion 14 is larger than the circumferential-direction width of the protrusion portion 42 of the case. In a case where the width of the concave portion 14 is larger than the width of the protrusion portion 42, the protrusion portion 42 fixes the case 40 to the base 10 at a high strength since the case 40 is in close contact with the side wall portion 13 inside the concave portion 14 in the entire circumferential-direction width.

Figure 9:
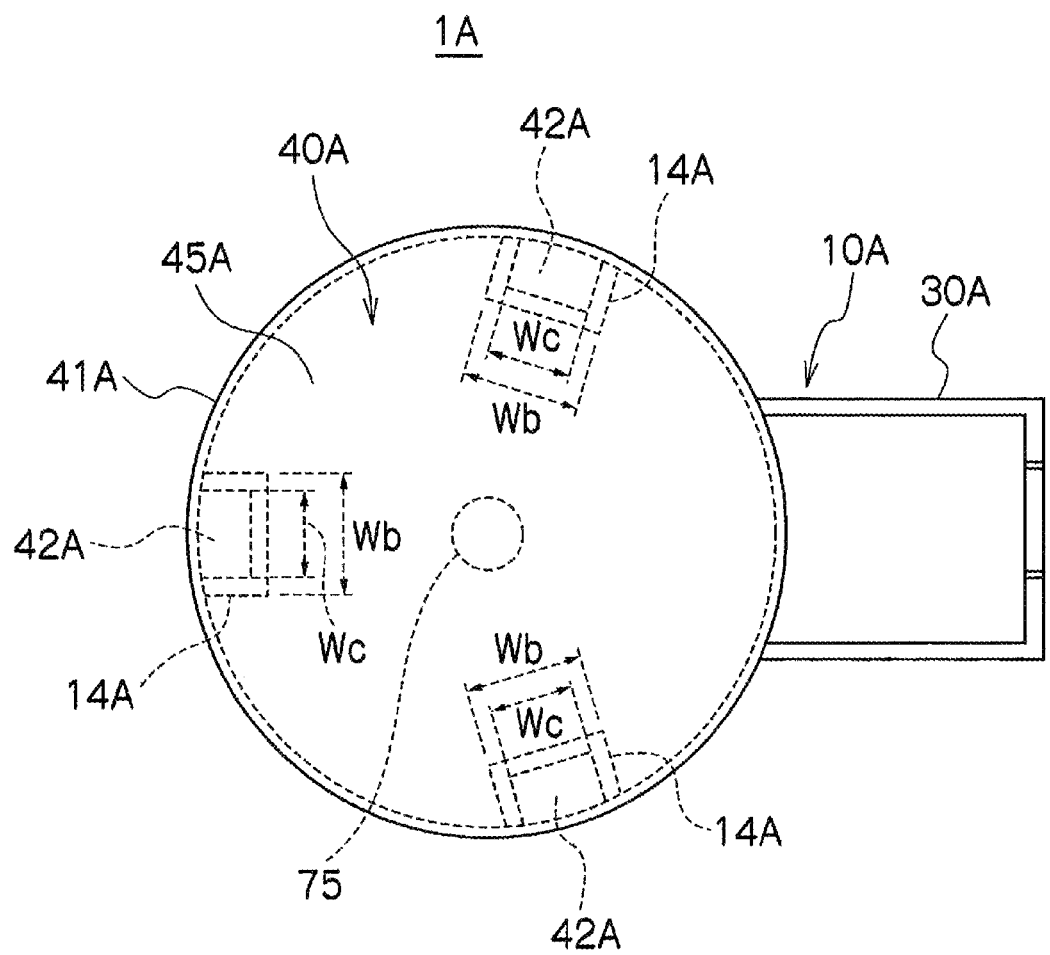
FIG. 9 is a plan view illustrating an overview of a vibration motor according to a preferred embodiment of the present invention other than that illustrated in FIG. 1.
Figure 10:
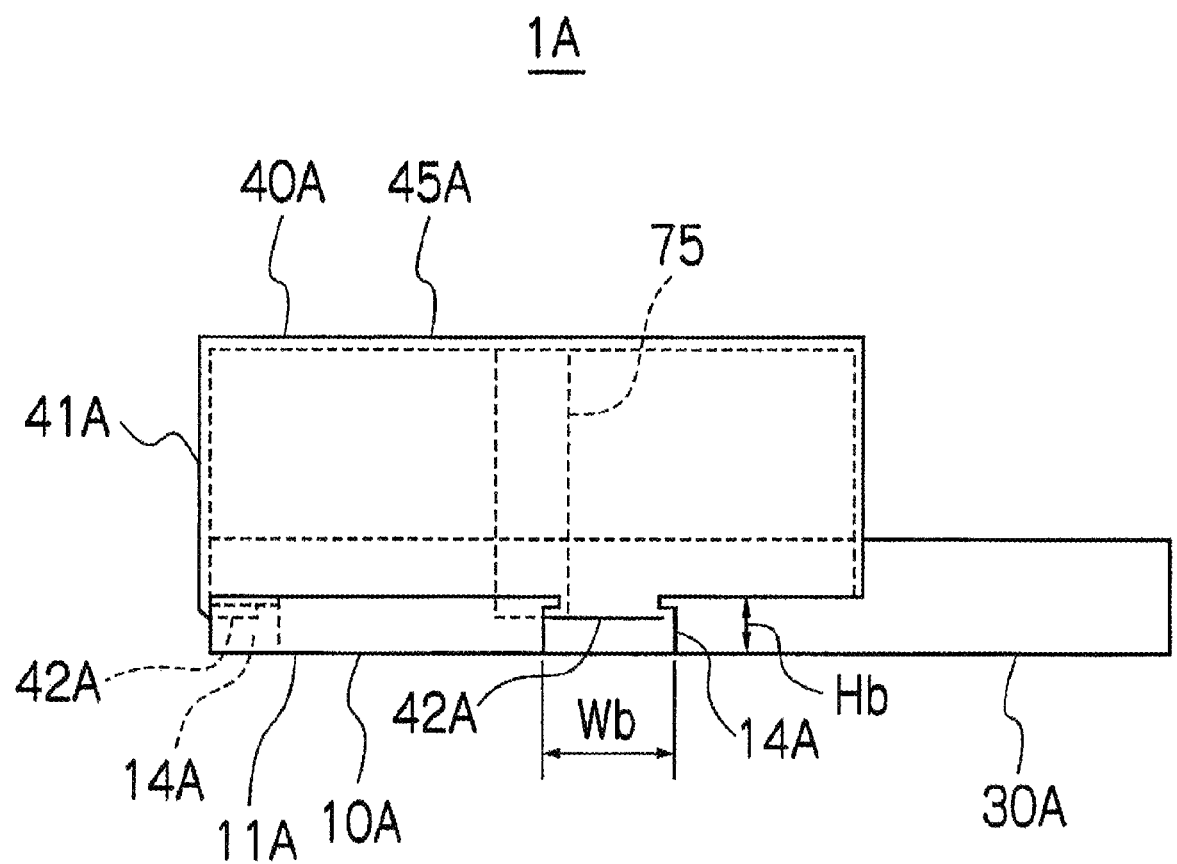
FIG. 10 is a side view illustrating the overview of the vibration motor illustrated in FIG. 9.
Figure 11:
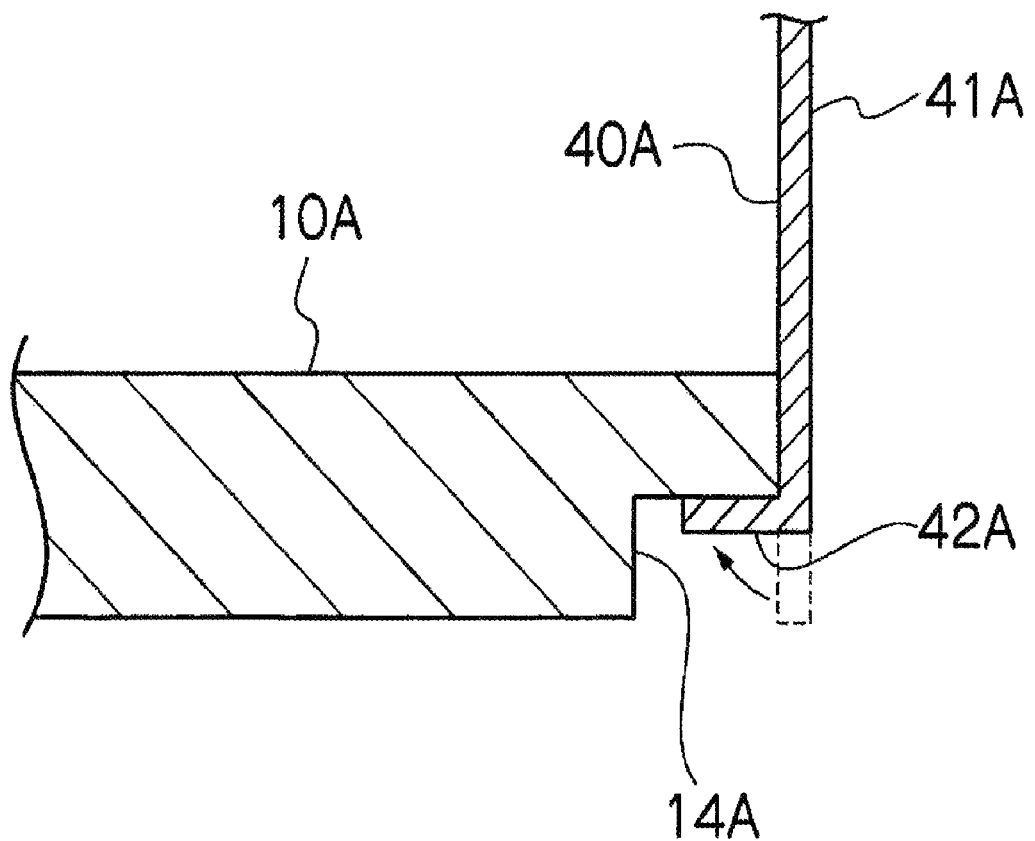
FIG. 11 is an explanatory drawing illustrating a bending of a protrusion portion of a case of the vibration motor illustrated in FIGS. 9 and 10 in a concave portion of a base configured to fix the case to the base.

Hereinabove, a case where the concave portion 14 of the base 10 is configured to include the first concave portion 15 and the second concave portion 16 and the protrusion portion 42 of the case 40 is configured to include the protrusion main body portion 43 and the extending portion 44 has been described as an example. However, a case 40A can also be fixed to a base 10A with a one-stage concave portion 14A being provided in the base 10A and a one-stage protrusion portion 42A being provided in the case 40A as illustrated in FIGS. 9 to 11. A case where the one-stage concave portion 14A is provided in the base 10A and the one-stage protrusion portion 42A is provided in the case 40A will be described with reference to FIGS. 9 to 11. For ease of description, only the case 40A, the base 10A, and the shaft 75 are illustrated in FIGS. 9 and 10. In addition, the base 10A that will be described as an example does not have a side wall portion at a circumferential edge of the base 10A.

The base 10A of a vibration motor 1A is configured to include a base main body portion 11A and a terminal portion arrangement portion 30A as illustrated in FIGS. 9 and 10. An outer circumferential surface of the base main body portion 11A preferably includes concave portions 14A at three circumferential-direction places, for example. Each of the concave portions 14A is defined by an outer circumferential surface of the base 10A being recessed inside from a radially outer side. In addition, each of the concave portions 14A is provided by an outer circumferential surface being recessed by one stage so that the height from a lower end portion of the base 10A is Hb and the width in the circumferential direction is Wb.

The case 40A preferably has a cylindrical shape, and is configured to have a tube-shaped circumferential surface portion 41A and a top surface portion 45A that closes an upper end of the circumferential surface portion 41A. The circumferential surface portion 41A includes protrusion portions 42A, which extend to the lower side from the lower end of the circumferential surface portion 41A, at three circumferential-direction places. The protrusion portion 42A is defined by allowing a lower end of the circumferential surface portion 41A to partially protrude to the lower side by one step. The circumferential-direction width Wc of the protrusion portion 42A is smaller than the circumferential-direction width Wb of the concave portion 14A defined in the base 10A. In other words, the circumferential-direction width Wb of the concave portion 14A is larger than the circumferential-direction width Wc of the protrusion portion 42A.

The case 40A is preferably fixed to the base 10A as follows.

As illustrated in FIGS. 9 and 10, the case 40A is covered by the base 10A so that an inner surface of the circumferential surface portion 41A of the case 40A is along the outer circumferential surface of the base main body portion 11A. When the case 40A is covered by the base 10A, the circumferential-direction position of the protrusion portions 42A matches with the circumferential-direction position of the concave portion 14A, and the case 40A is covered by the base 10A. After the case 40A is covered by the base 10A, the protrusion portion 42A defined in the circumferential surface portion 41A of the case 40A is preferably bent inside from the radially outer side of the base main body portion 11A inside the concave portion 14A of the base 10A as illustrated in FIG. 11 and an inner surface of the protrusion portion 42A is toward the upper side. The protrusion portion 42A is in a state of extending in the radial direction of the base 10A inside the concave portion 14A. The inner surface of the protrusion portion 42A that is toward the upper side is in contact with the base 10A inside the concave portion 14A.

The case 40A is in a state of being supported by the base 10A with the top surface portion 45A being supported by the upper end of the shaft 75 and the protrusion portion 42A being in contact with the base 10A inside the concave portion 14A. Accordingly, the case 40A is preferably in a state of pinching the shaft 75 and the base 10A with the top surface portion 45A and the protrusion portion 42A, and the case 40A is fixed to the base 10A.

When the protrusion portion 42A is bent in the concave portion 14A, the protrusion portion 42A is capable of being bent so that the entire protrusion portion 42A is accommodated in the concave portion 14A or can be bent so that only a portion of a tip end side of the protrusion portion 42A is accommodated in the concave portion 14A.

Figure 12:
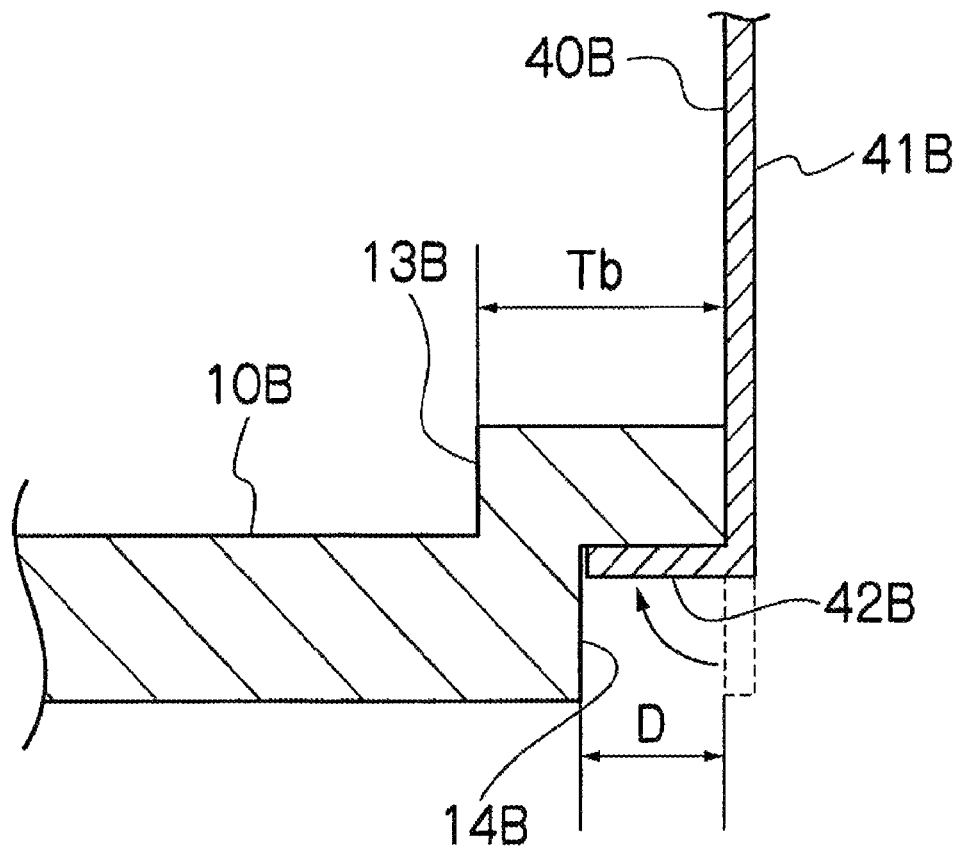
FIG. 12 is an explanatory drawing illustrating a bending of the protrusion portion in the concave portion of the base including a side wall portion configured to fix the case to the base.

Also, as illustrated in FIG. 12, a case 40B that includes a one-stage protrusion portion 42B in a circumferential surface portion 41B preferably is fixed to a base 10B that includes a one-stage concave portion 14B and a circumferential wall portion 13B at a circumferential edge. Even in this case, the protrusion portion 42B of the case 40B is bent inside the concave portion 14B of the base 10B, and the protrusion portion 42B extends inside from a radially outer side of the base 10B. The side wall portion 13B and the concave portion 14B are defined so that the radial-direction dimension Tb of the base of the side wall portion 13B is preferably larger than the radial-direction dimension D of the base 10B of the concave portion 14B.

Figure 13:
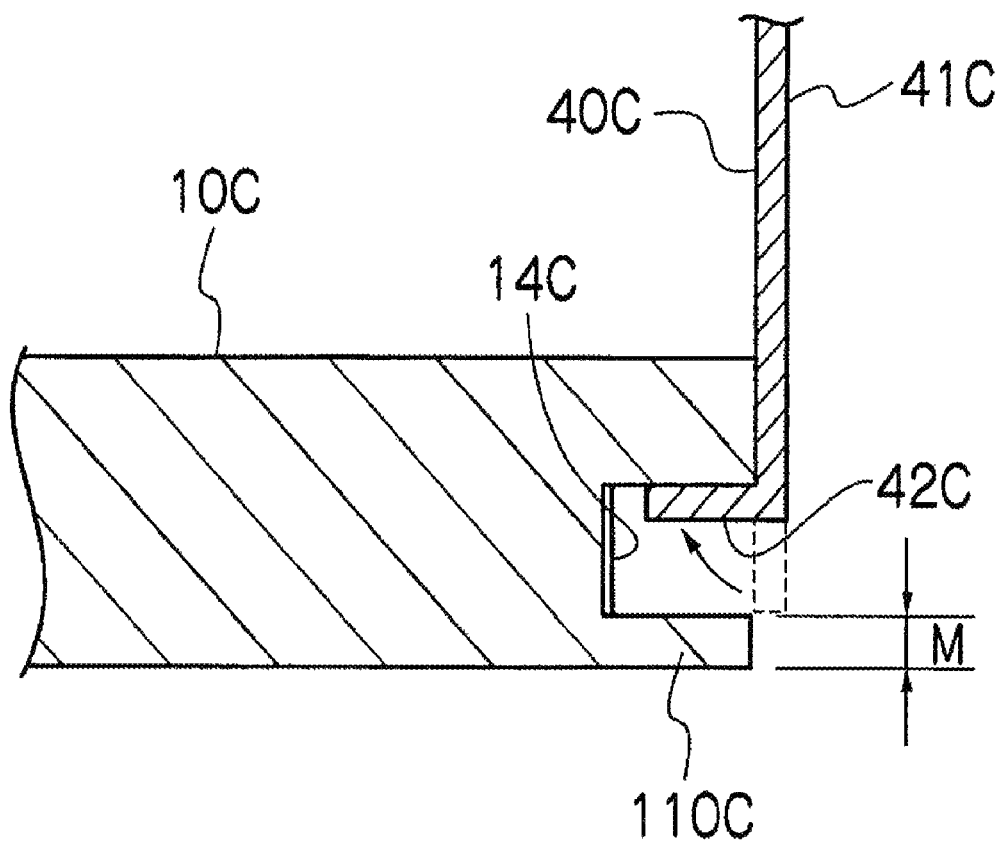
FIG. 13 is an explanatory drawing illustrating a bending of the protrusion portion in the concave portion where a lower end of the concave portion is positioned on a higher side than a lower end of the base configured to fix the case to the base.

Hereinabove, a case where the lower end of the second concave portion 16 preferably matches with the lower end of the base 10 has been described with reference to FIGS. 1 to 8 and a case where the lower ends of the concave portions 14A and 14B match with the lower ends of the bases 10A and 10B have been described with reference to FIGS. 9 to 12. However, the concave portion can also be provided by separating a lower end of a concave portion 14C from a lower end of a base 10C by a dimension M as illustrated in FIG. 13. In this case, a protrusion portion 42C is provided so that a gap is defined between a tip end of the protrusion portion 42C in a circumferential surface portion 41C and a position separated by the dimension M from a lower end of the base 10C in a state where a case 40C is covered by the base 10C. When the protrusion portion 42C is positioned so that the gap is defined between the tip end of the protrusion portion 42C and the position separated by the dimension M from the lower end of the base 10C, the protrusion portion 42C is folded inside the concave portion 14C out of contact with a lower-side portion 110C.

Although not illustrated in the drawings, the second concave portion can also be defined by separating the lower end of the second concave portion by the dimension M from the lower end of the base even in a case where the protrusion portion configured to have the protrusion main body portion and the extending portion is defined in the case and the concave portion configured to include the first concave portion and the second concave portion is provided in the base.

According to the case and the base having the above-described configuration, the extending portion defining the protrusion portion of the case is bent inside the second concave portion of the base to extend inside from the radially outer side and the protrusion portion of the case is bent inside the concave portion of the base to extend inside from the radially outer side so that the case can be fixed to the base. Accordingly, the vibration motor is manufactured without having to bond the case to the base by high-cost laser welding.

Next, components of the stator portion and the rotor portion accommodated in the space defined by the base and the case will be described.

As described above, the stator portion preferably includes the yoke plate 50, the circuit board 60 that is arranged on the base 10, the coil 70 that is arranged on the circuit board 60, and the shaft 75 including the upper end portion fixed to the top surface portion of the case 40 and the lower end portion fixed to the base 10 in addition to the base 10 and the case 40. The yoke plate 50 has already been described, and the components other than the yoke plate 50 will be described herein below.

A wiring pattern (not illustrated) is provided on a surface of the circuit board 60, and the circuit board 60 performs driving control on the vibration motor 1. The circuit board 60 is configured to have the substrate main body portion 61 that is arranged in the base main body portion 11, and the terminal portion 64 that juts toward an outer side of the substrate main body portion 61. The substrate main body portion 61 includes a hole 62, which is penetrated by the shaft 75, at the center of the substrate main body portion 61. The hole 62 preferably has a size at which a space is provided between the hole 62 and the shaft 75, and the hole 62 allows the cylindrical projecting portion 25, which is provided in the base 10, to be inserted. In addition, the substrate main body portion 61 preferably includes two holes 63 in an area between the hole 62 and a circumferential edge. The two holes 63 are provided at positions corresponding to the coil positioning units 19 provided in the base 10, and the coil positioning units 19 pass through the two holes 63. Various electronic components 65 are mounted on the substrate main body portion 61 as necessary.

The coil 70 is preferably defined by a conductive wire being wound. An outer circumferential surface of the coil 70 is preferably positioned so that the cross-sectional area on a height-direction lower side is larger than the cross-sectional area on a height-direction upper side. In addition, the coil 70 includes a hole 71, which penetrates the coil 70 in a height direction, in the middle of the coil 70. The hole 71 is a hole that is penetrated by the coil positioning unit 19 defined in the base 10. When the coil positioning unit 19 penetrates the hole 71 that is defined in the middle of the coil 70, the coil 70 is mounted on a predetermined position on the circuit board 60. Accordingly, the coil 70 is capable of being mounted on a predetermined position on the circuit board 60 without having to use a special jig. When the coil 70 is mounted, a certain area of the coil 70 that is positioned radially outside the base main body portion 11 is accommodated inside the recess 17 defined in the side wall portion 13 of the main body portion of the base 10.

The shaft 75 is provided to extend in the vertical direction in the middle of the vibration motor 1. A lower side of the shaft 75 is preferably accommodated in the hole 26 of the projecting portion 25 provided at the center of the base main body portion 11. In addition, the lower side of the shaft 75 is accommodated in the hole 56 provided at the center of the yoke plate 50, and is supported by the shaft supporting unit 52. In other words, the lower side of the shaft 75 is supported by the stator portion. An upper side of the shaft 75 is preferably fitted into the hole 46 provided at the center of the top surface portion 45 of the case 40 to be fixed to the top surface portion 45. The lower side of the shaft 75 is supported by the projecting portion 25 of the base 10 and the shaft supporting unit 52 of the yoke plate 50 and the upper side of the shaft 75 is supported by the top surface portion 45 of the case 40 so that the shaft 75 is maintained in a state of being perpendicular or substantially perpendicular to the base 10.

Moreover, the shaft 75 is preferably supported by a spacer 73 that is fitted into an outer circumferential portion at an intermediate portion in a longitudinal direction. The spacer 73 is arranged on the projecting portion 25 that is provided in the middle of the base 10. The spacer 73 and the projecting portion of the base 10 may be integrally provided as a single monolithic member.

The rotor portion includes the rotor yoke 80 that is supported to be rotatable about the shaft 75 via the bearing 85, the magnet 90 that is held by the rotor yoke 80, and the weight 100 that rotates about the shaft 75 and has the centroid position different than the central axis of the shaft 75.

The rotor yoke 80 preferably has a disc shape, and includes a bearing holding unit 82 at the center of the rotor yoke 80. The bearing holding unit 82 has a tubular shape, and accommodates the bearing 85 in the bearing holding unit 82 to hold the bearing 85. In addition, the bearing holding unit 82 includes the hole 84, which is penetrated by the shaft 75, at the center of the bearing holding unit 82.

The magnet 90 is preferably a doughnut-shaped permanent magnet. A certain space is defined between an inner circumferential surface of the magnet 90 and the bearing holding unit 82 of the rotor yoke 80, and the magnet 90 is preferably held by the rotor yoke 80 at a position where an outer circumferential surface of the magnet 90 is in close contact with an inner surface of a side surface portion 83 of the rotor yoke 80. The magnet 90 rotates about the shaft 75 with the rotor yoke 80.

The weight 100 preferably includes an upper surface portion 101 that has a semicircular shape or a substantially semicircular shape, and a side surface portion 102 that is provided in a circumferential edge portion of the upper surface portion 101. The upper surface portion 101 is preferably flat, and includes an arc-shaped recess 103 at the center of a linear portion 101a (refer to FIG. 2). The recess 103 is a site where the bearing holding unit 82 of the rotor yoke 80 is accommodated inside the recess 103. The side surface portion 102 preferably has a quadrangular cross-sectional shape as illustrated in FIG. 3. The weight 100 is arranged in the area on the side opposite to an area where the side surface portion 83 of the rotor yoke 80 is provided across the shaft 75. The weight 100 is mounted on the rotor yoke 80 in a state where the upper surface portion 101 of the weight 100 is covered on an upper surface portion 81 of the rotor yoke 80.

In the vibration motor 1 having the above-described configuration, the rotor yoke 80, the magnet 90 held by the rotor yoke 80, and the weight 100 rotate about the shaft 75 when voltage is applied to the vibration motor 1. The centroid of the weight 100 is shifted radially outside the vibration motor 1 from the center of the shaft 75, and thus vibration is generated when the weight 100 rotates.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A vibration motor comprising:
a stator portion including a base, a case that includes a circumferential surface portion having a tube shape and a top surface portion closing an upper end of the circumferential surface portion, and is fixed to the base in a lower end portion of the circumferential surface portion, a yoke plate that is mounted on the base and made of a magnetic material, a circuit board that is arranged on the base, a coil that is arranged on the circuit board, and a shaft that includes an upper end portion fixed to the top surface portion of the case; and
a rotor portion including a rotor yoke that is supported to be rotatable about the shaft via a bearing, a magnet that is held by the rotor yoke, and a weight that is configured to rotate about the shaft, and has a centroid position different from a central axis of the shaft; wherein
the case includes a protrusion portion that extends from a lower end of the circumferential surface portion;
a lower end portion of the shaft is fixed to the stator portion;
the base includes a concave portion that is recessed from a radially outer side of the base to a radially inner side of the base at a position overlapping with at least the protrusion portion at a circumferential edge of the base in a circumferential direction;
the protrusion portion is accommodated in the concave portion, and the entire protrusion portion or a portion of a tip end side in a direction that the protrusion portion extends is bent radially inside the base so that a surface of the protrusion portion facing an upper side is in contact with the base; and
at least a portion of a surface of the yoke plate on the circuit board side is exposed.

2. The vibration motor according to claim 1, wherein
the protrusion portion includes an extending portion that extends from a lower end of the protrusion portion;
the concave portion includes a recessed first concave portion and a recessed second concave portion that is recessed more deeply than the recessed first concave portion;
the protrusion portion is accommodated in the recessed first concave portion;
an entirety of the extending portion or a portion of a tip end side in an extending direction of the extending portion extends from the radially outer side of the base to the radially inner side of the base inside the recessed second concave portion, a surface of the extending portion facing the upper side, being in contact with the base; and
at least a portion of the lower end portion of the circumferential surface portion is in contact with the base at a different circumferential-direction position than the protrusion portion.

3. The vibration motor according to claim 1, wherein
the base includes a side wall portion at the circumferential edge of the base;
an upper surface of the side wall portion is positioned higher on an axial side than an axially lower surface of the circuit board; and
a radial-direction dimension of the side wall portion at a position of the concave portion is larger than a dimension of a recessed portion of the base recessed from the radially outer side to the radially inner side.

4. The vibration motor according to claim 2, wherein
the base includes a side wall portion at the circumferential edge of the base;
an upper surface of the side wall portion is positioned higher on an axial side than an axially lower surface of the circuit board; and
a radial-direction dimension of the side wall portion at a position of the concave portion is larger than a dimension of a recessed portion of the base recessed from the radially outer side to the radially inner side.

5. The vibration motor according to claim 2, wherein
a width of a side wall portion in the circumferential direction of the base is larger than a width of the protrusion portion in the circumferential direction of the case.

6. The vibration motor according to claim 4, wherein
a width of the side wall portion in the circumferential direction of the base is larger than a width of the protrusion portion in the circumferential direction of the case.

7. The vibration motor according to claim 1, wherein
the base is a resin-molded body; and
the base includes at least two coil positioning portions on an upper surface side of the base, the at least two coil positioning portions being convex portions that maintain the coil at a predetermined position on the circuit board.

8. The vibration motor according to claim 7, wherein
the at least two coil positioning portions and the shaft are respectively arranged at positions where line segments that respectively link centers of the at least two coil positioning portions to a center of the shaft define a triangular shape on a surface of the base where the circuit board is located.

9. The vibration motor according to claim 1, wherein
the concave portion and a center of the coil are located at different positions in the circumferential direction of the base.

10. The vibration motor according to claim 1, wherein
the coil and the circumferential surface portion of the case are partitioned by a portion of a side wall portion of the base.

11. The vibration motor according to claim 10, wherein
the side wall portion includes a recess on an inner circumferential wall side of the side wall portion, the recess being configured to accommodate the coil; and
a curvature on an outer circumferential wall side of a portion of the side wall portion including the recess is smaller than a curvature on an inner circumferential wall side of a portion of the side wall portion including the recess.

12. The vibration motor according to claim 11, wherein
a portion of the side wall portion including the recess is lower in height than the coil in a thickness direction of the base.

13. The vibration motor according to claim 1, wherein
a side wall portion of the base includes at least one groove extending across the base in a radial direction of the base;
a lead wire of the coil is soldered to a land on the circuit board inside the groove in the radial direction of the base; and
a tip end of the lead wire is positioned inside the groove or inside an outer end of the groove.

14. The vibration motor according to claim 2, wherein the yoke plate includes an area outside an area on a center side in a radial direction of the base, the area being positioned on a thickness-direction upper side of the base, the yoke plate including a shaft supporting portion configured to support the shaft at the center side of the base in the radial direction;
the shaft supporting portion includes a bent portion that is bent around a through-hole defined in a middle of the yoke plate; and
the bent portion supports an outer circumferential surface of the shaft.

15. The vibration motor according to claim 2, wherein
the yoke plate and the base are integrally provided by being insert molded with each other; and
the base includes positioning holes at two or more locations of the base, the positioning holes penetrate the base in a thickness direction and determine a position of the yoke plate with respect to the base.

16. The vibration motor according to claim 14, wherein
the yoke plate and the base are integrally provided by being insert molded with each other; and
a portion of the yoke plate is exposed from the base.

17. The vibration motor according to claim 16, wherein
the base includes an exposure portion that allows a lower surface of the yoke plate to be exposed.

18. The vibration motor according to claim 2, wherein
the base includes a base main body portion where a main body of the circuit board is provided, and a terminal portion arrangement portion where a terminal portion of the circuit board is provided; and
the terminal portion arrangement portion juts outside from the base main body portion, and includes a rib extending along a circumferential edge of the terminal portion arrangement portion.

19. The vibration motor according to claim 2, wherein the concave portion and a center of the coil are at different circumferential-direction positions of the base.

\* \* \* \* \*